3,616,564
Patented Nov. 2, 1971

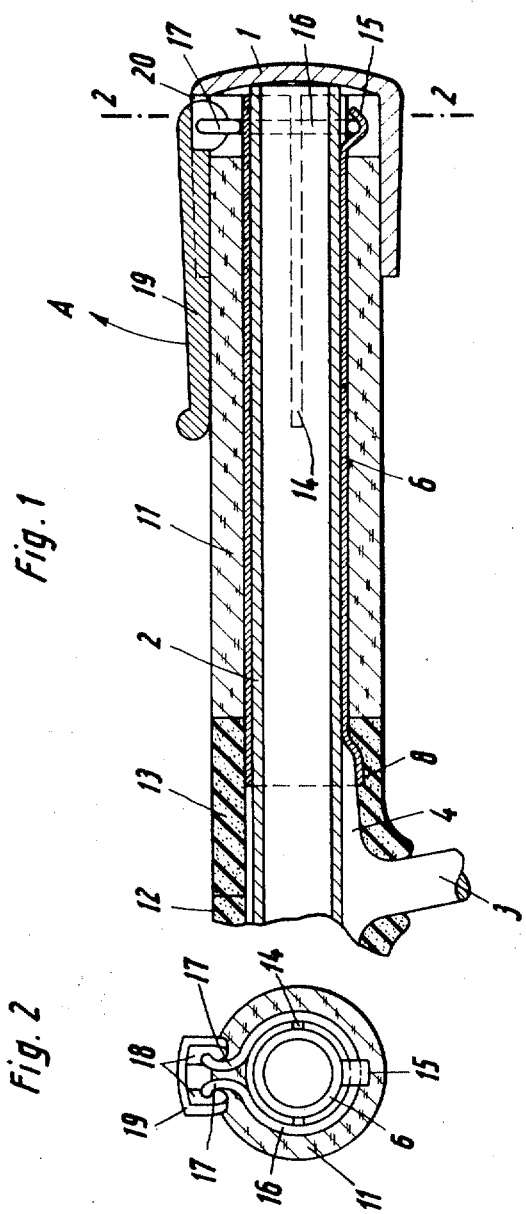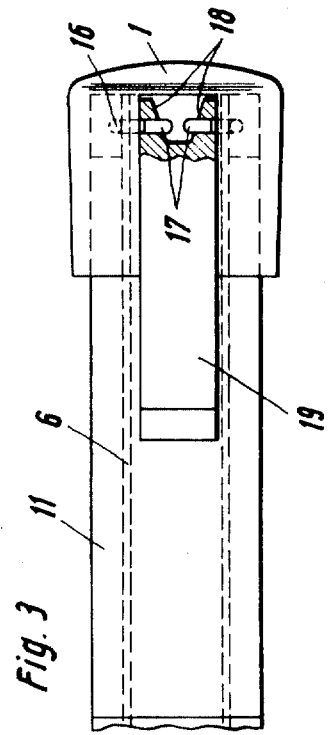

3,616,564
DEVICE FOR ATTACHING FISHING REELS TO
FISHING TACKLES
Rudolf Schultz, Berlin, Germany, assignor to Deutsche
Angelgerate Manufaktur (DAM) Hellmuth Kuntze
Gesellschaft mit beschrankter Haftung & Co., Kommanditgesellschaft, Berlin, Germany
Filed Nov. 5, 1969, Ser. No. 874,257
Claims priority, application Germany, Dec. 10, 1968,
G 68 11 310.0–7401
Int. Cl. A01k 87/06
U.S. Cl. 43—22
2 Claims

ABSTRACT OF THE DISCLOSURE

A fishing tackle has a handle carrying the fishing rod. Two sleeves are mounted upon the handle. One of these sleeves is fixed to the handle while the other is slidable thereon. The two sleeves have opposed shoe-like extensions with inclined surfaces adapted to overlap opposite ends of flanges carried by a foot constituting the support of the fishing reel. The sleeves are enclosed by covers of poor heat conducting material. The T-shaped reel support is clamped and held firmly by the two sleeves and their covers. The movable sleeve has elongated slits extending from its free end and terminating intermediate its ends; a resilient clamping ring encloses this end of the sleeve and has outwardly extending legs engaging inner inclined surfaces of a fork constituting an end of a tensioning lever pivotally secured to the ends of said legs. When the lever is swung, the ring will firmly clamp the sleeve upon the handle. An end cap is connected with the cover enclosing the movable sleeve and has a recess for the tensioning lever.

---

This invention relates to a device for attaching a fishing reel having a T-shaped support to the handle of a fishing tackle.

In existing constructions this handle consists of a tubular body carrying two sleeves located on opposite sides of the reel support. One of these sleeves is firmly connected with the handle while the other sleeve is slidable thereon. Each sleeve has a shoe-like extension with an inclined surface adapted to extend over an end of a flange constituting a part of the T-shaped reel support. Each sleeve is enclosed by a cover which is a poor conductor of heat. The sleeves and the covers firmly enclose and hold the T-shaped support.

An object of the present invention is the provision of a device which will firmly hold the reel support and yet will make possible an easy exchange of reels.

Another object is the provision of a device of this type which is so constructed that it is difficult to lose its individual parts.

Other objects of the present invention will become apparent in the course of the following specification.

In the accomplishment of the objectives of the present invention it was found desirable to provide the movable sleeve with elongated slits extending from its free end and terminating intermediate its ends. A resilient clamping ring encloses this end of the sleeve and has outwardly extending legs engaging inner inclined surfaces of a fork constituting an end of a tensioning lever pivotally secured to the ends of said legs. When the lever is swung into a position substantially parallel to the sleeve, the ring will firmly clamp the sleeve upon the handle. An end cap is connected with the cover enclosing the movable sleeve and has a recess receiving the tensioning lever and preventing its side shifting. The clamping ring is held by a loop provided upon the free end of the movable sleeve.

The invention will appear more clearly from the following detailed description when taken in connection with the accompanying drawing, showing, by way of example only, a preferred embodiment of the inventive idea.

In the drawing:

FIG. 1 is a longitudinal section through a portion of the handle of a fishing tackle and illustrates the attaching device of the present invention;

FIG. 2 is a transverse section along the line 2—2 of FIG. 1;

FIG. 3 is a side view, some parts being shown in section.

The fishing tackle of the present invention has a tubular handle 2 serving as a carrier for a fishing reel. A fishing rod (not shown) extends into one end of the handle 2 and is firmly connected therewith. The fishing reel, which is also not shown, has a T-shaped support consisting of a foot 3 and two opposed flanges 4, one of which is shown in FIG. 1. The flanges 4 lie against the tubular handle 2. The handle 2 carries two sleeves located on opposite sides of the reel support. These sleeves have shoe-like extensions extending over the ends of the flanges. One of these sleeves, located to the left of the foot 3, is not shown in FIG. 1. It is firmly connected with the handle 2. The other sleeve 6 is slidably mounted upon the handle 2 and has an extension 8 extending over one of the flanges 4. The two sleeves firmly hold the reel by engaging the two flanges 4 from opposite sides of the foot 3.

Each sleeve is enclosed by a cover consisting of two adjacent parts both of which are poor conductors of heat. The sleeve 6 carries a cover 11 consisting, for example, of cork or a plastic material and an adjacent cover 13 consisting of rubber. The other sleeve which is not shown is also enclosed by two covers, including a rubber cover 12, a portion of which is shown in FIG. 1. When the reel support is tightly mounted, the two rubber covers 13 and 12 will engage each other and will tightly enclose the foot 3 of the reel support, possible differences in length being balanced. For that purpose, the covers 12 and 13 may be provided with suitable recesses.

Thus the clamping of the reel support between the two sleeves is actually a clamping connection between the tubular handle 2 and the movable sleeve 6. For that purpose, the movable sleeve 6 is provided with longitudinal slits 14 extending from the free front edge of the sleeve and having a length which is adequate to provide effective clamping of the sleeve upon the handle 2. The free end of the sleeve 6 has a loop 15 through which a resilient clamping ring 16 extends. The ring 16 encloses the sleeve 6 and has two outwardly extending legs 17 located opposite the loop 15 and engaging the surfaces 18 of a fork which are inclined toward the axis of the sleeve and toward each other. The bore carrying the surfaces 18 constitutes one end of a tensioning lever 19 to which the ends of the legs 17 are pivotally secured.

An end cap 1 is firmly connected with the cover 11 and has a recess 20 receiving the lever 19 and preventing it from shifting sidewise.

The drawing shows the handle with the fishing reel firmly clamped thereon. The sleeve 6 has been pushed over the end of the adjacent flange 4, so that the two sleeves firmly engage the two flanges 4, and so that the reel foot 3 is clamped between them. The lever 19 holds the ring 16 under tension, so that the sleeve 6 is frictionally held against the handle 2 and is locked.

To release the lock, the lever 19 is moved in the direction of the arrow A (FIG. 1) and is raised, whereby the legs 17 of the ring 16 slide outwardly along the inclined surfaces 18. The ring 16 is placed out of tension, thus releasing the sleeve 6 from its clamping connection with the handle 2. Then the sleeve 6 can be pulled rearwardly along with the cap 1 and the covers 11 and 13, thereby releasing the flange 4 of the reel support.

Since all these parts form a combined unit, the user can not lose them individually.

The lever 19 can be coated with a plastic material for insulation purposes. Furthermore, the lever 19 can be so shaped and arranged that it will extend into a recess provided in the cover 11 in its closed position.

I claim:

1. In a fishing tackle carrying a fishing reel having a supporting flange, in combination, a tubular handle, a sleeve slidable upon said handle and having an end adapted to engage said flange, said sleeve having longitudinal slits extending from the other end of the sleeve and terminating intermediate its ends, a resilient clamping ring connected with said sleeve and surrounding said sleeve adjacent said other end thereof, said ring having outwardly extending legs, a tensioning lever located outside of said handle and having a fork pivotally secured to the ends of said legs, said fork having inclined surfaces engaging said legs, said legs being pressed against each other by said surfaces and said ring being clamped when said lever extends parallel to said handle, a cover enclosing said sleeve and a cap connected with said cover and enclosing said other end of the sleeve, said cap having a recess receiving a portion of said lever.

2. A device in accordance with claim 1, wherein said sleeve has a loop through which said ring extends, said legs of the ring being located opposite said loop.

References Cited

UNITED STATES PATENTS

| | | | |
|---|---|---|---|
| 1,494,552 | 5/1924 | Kawell | 43—22 |
| 3,098,313 | 7/1963 | Portz | 43—22 |
| 3,226,873 | 1/1966 | Wood | 43—22 |
| 3,295,244 | 1/1967 | Kuntze | 43—22 |

WARNER H. CAMP, Primary Examiner